J. W. SCHATZ.
PROCESS OF MAKING HOLLOW METALLIC BALLS.
APPLICATION FILED JULY 11, 1911.
1,039,673.
Patented Sept. 24, 1912.
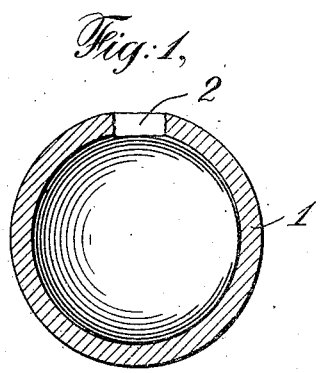
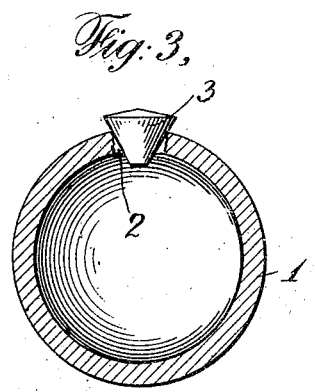
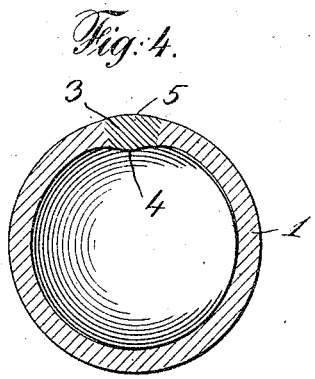
Witnesses:
Max B. A. Doring
F. M. Donsbach
Inventor
John W Schatz
By his Attorney
Phillips Abbott

UNITED STATES PATENT OFFICE.

JOHN W. SCHATZ, OF POUGHKEEPSIE, NEW YORK, ASSIGNOR OF ONE-HALF TO HERMAN A. SCHATZ, OF POUGHKEEPSIE, NEW YORK.

PROCESS OF MAKING HOLLOW METALLIC BALLS.

1,039,673.   Specification of Letters Patent.   Patented Sept. 24, 1912.

Application filed July 11, 1911. Serial No. 637,882.

*To all whom it may concern:*

Be it known that I, JOHN W. SCHATZ, a citizen of the United States, and a resident of the city of Poughkeepsie, county of Dutchess, State of New York, have invented a new and useful Process of Making Hollow Metallic Balls, of which the following is a specification, reference being had to the accompanying drawings.

The purpose of this invention is to reduce the cost of metallic balls and to so construct them that they shall be semielastic, of reduced weight and that their yielding quality or elasticity shall be practically uniform throughout against pressures coming from any and all directions.

Referring to the drawings, Figure 1 illustrates a medial sectional view of a ball in process of construction; Fig. 2 illustrates one form of closure used to close or fill the opening left in the ball as shown in Fig. 1; Fig. 3 illustrates the ball of Fig. 1 with the closure of Fig. 2 in position within the hole in the ball ready for the welding and compressing operations; Fig. 4 illustrates the structure after the closure has been welded in place within the hole in the ball.

For a general description of the balls contemplated in this invention, their uses and general method of construction, I refer to United States Letters Patent No. 955,698, granted to me and dated April 19, 1910, upon which this present invention is in some respects and for certain uses an improvement.

In the drawings 1 represents the blank from which the ball is made after it has been submitted to the swaging or forming operations referred to in said patent up to the point at which the ball is practically spherical in shape, having, however, usually slightly greater diameter on the transverse line through the hole than in the opposite direction, 2 represents the hole left by the partially incomplete closing together or inward folding of the edges of the blank, 3 represents one form of closure. It resembles somewhat a button or plug and is preferably made of the same kind of metal as that composing the ball itself. I prefer to make the closure plug in the general form of a truncated cone, as shown, but it may be given any other suitable shape and need not be specially made for this purpose; that is to say, an ordinary rivet the head of which is of suitable size and preferably round, or a round headed screw may be used in place of the conical plug illustrated, but if so, the shank of the rivet or screw, which will usually project radially after the welding operation has been performed should be cut off before the grinding operation to make the ball spherical is done.

The method or process is as follows. The closure, whether a button, plug, rivet head or screw head, is first placed in the hole in the ball as shown in Fig. 3, the parts so assembled are then subjected to the operation of an electric welding current or a blow pipe jet or equivalent heating means, until the parts become very hot, usually a white heat approaching the fusing point will be found desirable to produce perfect work, although good results can be secured by a somewhat less degree of heat; when the parts are heated a suitable flux may be applied, although that is not in many instances necessary. Pressure is then applied upon the outer surface or end of the closure, whereby it is forced inwardly toward the center of the ball. The result will be that the closure whatever its form may be will be forced into the hole in the ball and the contacting metal surfaces will be intimately forced together and intermeshed constituting a most perfectly welded joint in which no line of union can be detected.

I usually apply such a degree of pressure that the metal shall bulge inwardly somewhat as shown at 4 in Fig. 4, but this is not necessary. If the partly formed ball be oblong to any degree as is sometimes the case, as suggested above, then the pressure may beneficially be such and the die or former by which the pressure is applied be of such shape that the ball will be swaged into a more nearly spherical form thereby, thus making the finished article more perfect and reducing the amount of grinding required. Also if specially made closures are used, such as the button or plug illustrated in Fig. 2, I prefer to make them of such size and shape that when the welding operation is completed, their outer surface will be about flush with the outer surface of the ball, as shown at 5 in Fig. 4.

After the welding has been accomplished the balls are submitted to the action of suitable grinding mechanism whereby they are made truly spherical and polished in a manner well known.

It will be obvious to those who are familiar with such matters that the special details of the above description may be somewhat departed from and still the essentials of my invention retained. I do not therefore limit myself to such details.

I claim:

1. The method described consisting in taking a substantially spherical hollow metallic body having a hole in one side, applying a suitable metallic closure larger than the hole upon the hole, heating the closure and the metal of the body adjacent to the hole and then pressing the closure into the hole.

2. The method described consisting in taking a substantially spherical hollow metallic body having a hole in one side, applying a suitable metallic closure larger than the hole upon the hole, heating the closure and the metal of the body adjacent to the hole, pressing the closure into the hole and grinding the resulting ball into substantially accurate spherical form.

3. The method described consisting in taking a substantially spherical hollow metallic body having greater diameter in one direction than in the opposite direction and having a hole in the axis of the longer dimension, applying a suitable metallic closure larger than the hole upon the hole, welding the same therein and swaging the body into more nearly spherical form by the aid of heat and pressure.

4. The method described consisting in taking a substantially spherical hollow metallic body having a hole in one side, applying a suitable closure larger than the hole upon the hole, heating the closure and the metal of the body adjacent to the hole, pressing the closure into the body until the outer surface of the closure is substantially even with the outer surface of the body and then grinding the resulting article in spherical form.

5. The method described consisting in taking a substantially spherical hollow metallic body having a hole in one side, applying a suitable closure larger than the hole upon the hole, heating the closure and the metal of the body adjacent to the hole, and pressing the closure into the body until the outer surface of the closure is substantially even with the outer surface of the body.

In testimony whereof I have signed my name to this specification in the presence of two subscribing witnesses.

JOHN W. SCHATZ.

Witnesses:
GEO. WORRALL,
MARGUERITE BOCK.